No. 719,018. PATENTED JAN. 27, 1903.
H. W. LEONARD.
AUTOMATIC ELECTRIC CIRCUIT CONTROLLER.
APPLICATION FILED MAY 7, 1901.
NO MODEL. 2 SHEETS—SHEET 1.

Witnesses:
Jas. F. Coleman
Archibald G. Reese

Inventor
Harry Ward Leonard
by Dyer Edmonds & Dyer
Att'ys.

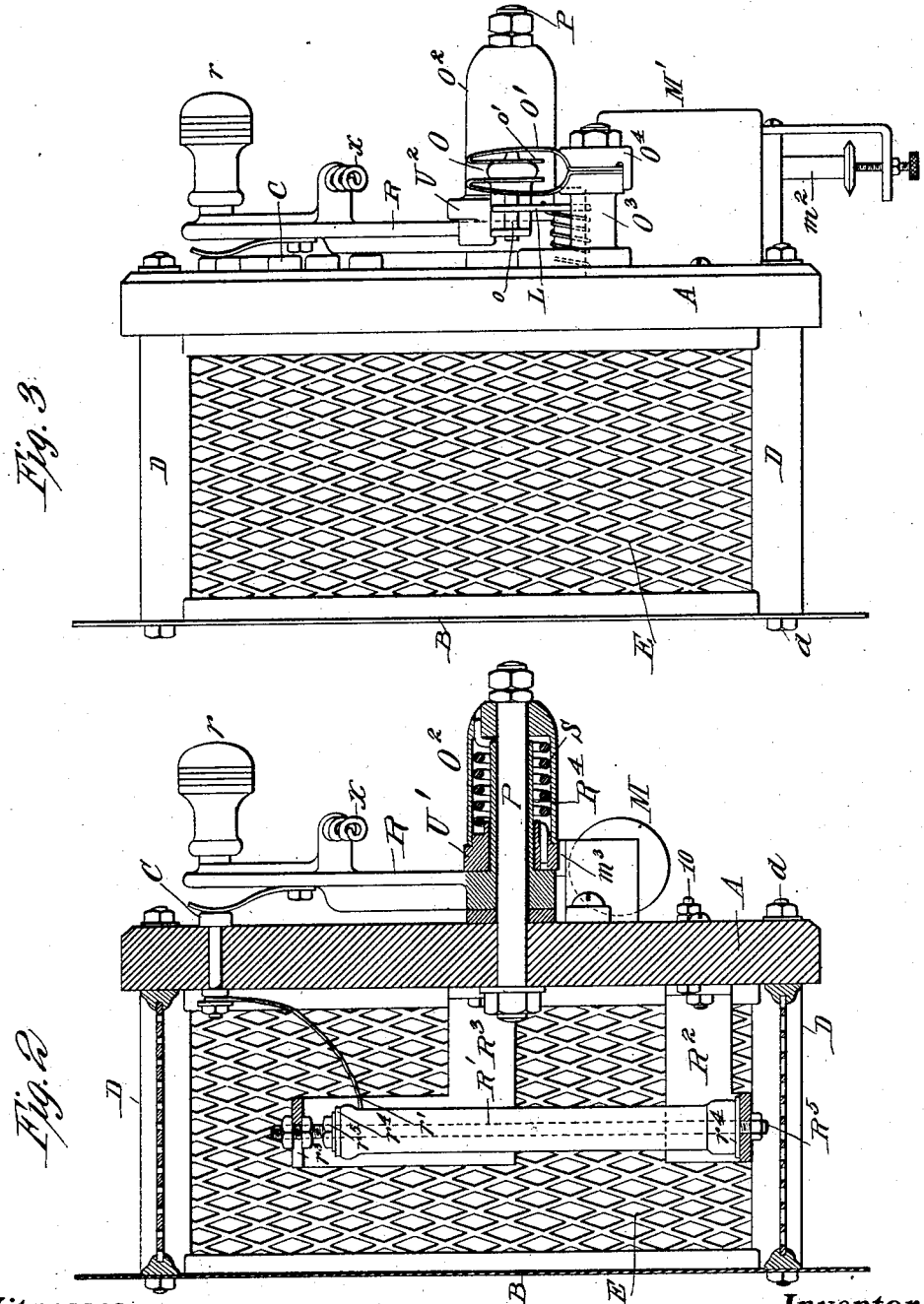

UNITED STATES PATENT OFFICE.

HARRY WARD LEONARD, OF NEW YORK, N. Y.

AUTOMATIC ELECTRIC-CIRCUIT CONTROLLER.

SPECIFICATION forming part of Letters Patent No. 719,018, dated January 27, 1903.

Application filed May 7, 1901. Serial No. 59,122. (No model.)

*To all whom it may concern:*

Be it known that I, HARRY WARD LEONARD, a citizen of the United States, and a resident of the borough of Manhattan, in the city of New York, county and State of New York, have invented a certain new and useful Improvement in Automatic Electric-Circuit Controllers, of which the following is a specification.

My invention relates to electrical circuit-controlling devices provided with means for securing automatic operation under certain conditions in the circuit—such, for example, as "no voltage," "excessive current," &c.; and my invention relates more particularly to rheostats employed for controlling the speed of electric motors—that is, a rheostat in which the moving contact-lever will remain at any point to which it is moved. In apparatus of this character it is desirable that the "no-voltage" device and the "overload" device should be independent of each other in their action, thus securing the greatest measure of reliability. It is also important that these two devices be so arranged that it will be impossible for the operator to manipulate them improperly. For example, in a rheostat it should be impossible for the operator to first cut out resistance and then close the circuit, making a short circuit. It is also important that the overload device should be free to respond to conditions of overload at all times, both while the controller is being operated and after it has been operated or adjusted.

In rheostats for controlling electric motors it is desirable to have a device which will automatically cause the movement of the rheostat switch-arm to its initial or starting position whenever a condition of "no voltage" occurs on the circuit of the motor, so that if the motor comes to rest and then the full electromotive force comes suddenly on the circuit again the motor and rheostat will be protected against an excessive current. It is also desirable to have the circuit protected by an automatic circuit-breaker which will open the circuit whenever from any cause the current exceeds a predetermined maximum.

By my invention I secure the features above stated and also other advantageous features, which are referred to in detail hereinafter, reference being had to the accompanying drawings, in which—

Figure 1:
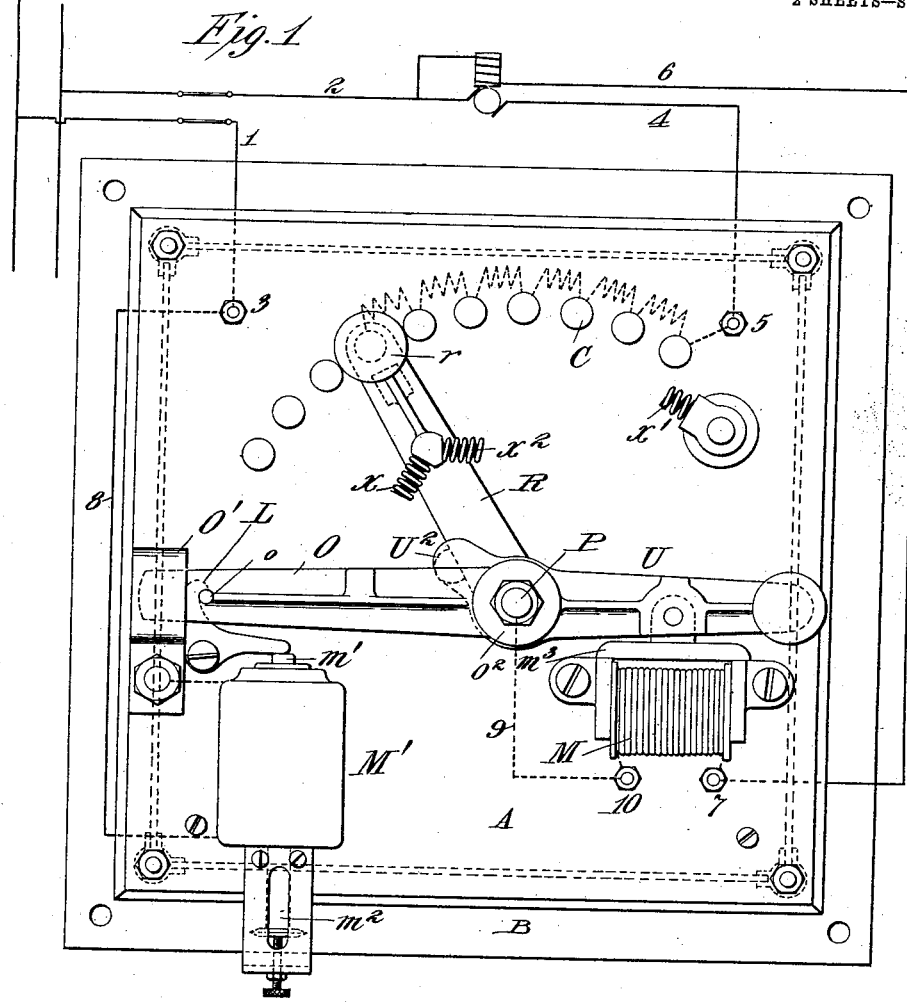
Figure 4:
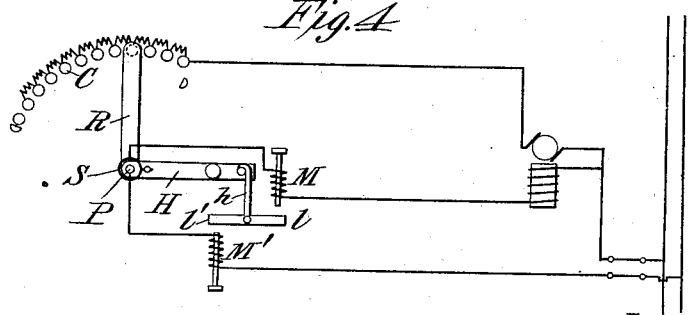

Figure 1 is a plan view of a motor-speed-controlling rheostat and the circuit connections. Fig. 2 is a vertical cross-section; Fig. 3, an end view looking from the left of Fig. 1, and Fig. 4 is a diagrammatic view of a modified arrangement.

Referring to Figs. 1, 2, and 3, R is the rheostat-switch, pivoted upon a stud P, which is secured to the base A, of slate or other suitable insulating material, said switch being provided with the usual knob or handle $r$ for moving it over the rheostat-contacts. Since the rheostat illustrated in the drawings is one designed mainly for regulating the speed of electric motors or the energy delivered to other forms of translating devices, switch R is not provided with means for automatically restoring it to the initial or starting position, as is usual in motor-starting or similar rheostats. The contact-buttons C, as shown in Fig. 2, are provided with screw-threaded shanks projecting through the base and are held in position by ordinary nuts. The resistance is arranged in sections or steps upon tubes R', of mineral insulating material, such as pottery, and secured thereon by a low-fusing enamel and provided with proper terminals or leads $r'$, connecting the resistance-sections together and to the shanks of the contact-plates, such resistance-tubes being of the character described in my application, Serial No. 42,753, filed January 10, 1901. To support the resistance-tubes in position upon the under side of the base-plate, I provide two racks $R^2$ and $R^3$, which are preferably made of iron bent at the ends to form brackets, which are secured to the base-plate, as shown in Fig. 2. Rack $R^2$ is provided with a series of holes to receive bolts $R^5$, and rack $R^3$ is provided with a series of slots $r^3$ (see Fig. 2) to receive the other end of the bolt after the resistance-tube is placed thereon. Each bolt or rod $R^5$ is clamped to the rack $R^3$ by two clamping-nuts threaded on the bolt, as shown in Fig. 2. Each resistance-tube is separated from rack $R^2$ by a washer $r^4$, of insulating material, such as asbestos, and at the opposite end of the tube is a similar washer, the tube being held against longitudinal movement on the rod by a metal washer and nut $r^5$. The resistance-tubes, circuit connections, &c., upon the under side of the base are protected by a bottom plate and casing, as shown in Figs. 2 and 3. The bottom plate B is preferably heavy sheet-iron, secured to the base-plate A by metal posts D and bolts $d$, one of these posts being placed at each corner of the casing. Posts D are slotted to receive the ends of perforated sheets E, made of any suitable material, but preferably of sheet-iron.

Arm O is the automatic overload-switch, which is arranged to make contact with the stationary switch element O'. This switch is provided with a barrel $O^2$, within which is a coiled spring S, one end of which is secured to the barrel and the other end is secured to the hub or collar of the hammer-blow device, to be referred to hereinafter. Switch-arm O is held in its normal position by a latch L, pivoted upon the base A and held by a light spring in position to engage a pin $o$ on the switch-arm. This latch is provided with a projection which extends over a pin $m'$, working through the casing of a solenoid M', and which pin is arranged to be struck by the vertically-moving core $m^2$ of the solenoid, which action results in the tripping of the latch and the release of the switch-arm O, and which arm when released is thrown forward by spring S toward the rheostat-switch R, opening the circuit at the contact O'. Contact O' is formed of two pieces of sheet-copper bent upon themselves, as shown in Fig. 3. These pieces are clamped between a support $O^3$, secured to the base-plate A, and a clamping-plate $O^4$. The end of switch O enters between the two ends $o'$ of the pieces of sheet-copper and makes heavy rubbing contact therewith. When switch O responds to an overload-current, it strikes a coiled-spring bumper $x$ on the rheostat-lever R, which switch is carried forward by the switch O and the movement of both is arrested when switch R strikes a coiled-spring bumper $x'$, carried by a post secured to the base A.

Device U, which responds to underload or no voltage, is not a current-carrying lever, its function being to operate the levers R and O manually to close the circuit through the controller and to automatically impart a blow to the rheostat-switch and drive it to its initial or starting position upon the occurrence of an underload or the condition of no voltage. Arm U is provided with a collar U', which is sleeved upon the sleeve $R^4$ of the rheostat-switch and to which collar one end of spring S is secured, the spring being coiled in such direction and placed under tension so as to tend to drive arms O and U toward each other when released. Collar U' is provided with an arm $U^2$, having a stud upon its under side in position to engage rheostat-switch R, as shown in Fig. 1. The object of this arm $U^2$ is to engage the rheostat-switch when the arm U is operated, so as to move the rheostat-switch to the position shown in Fig. 1, at which position the circuit is closed through the controller, the first three contact-buttons shown in Fig. 1 being blind contacts. After the controller is in the position shown in Fig. 1 arm U will be held through its armature $m^3$ by underload-magnet M, and rheostat-arm R may be moved to any other contact C to vary the resistance in the armature-circuit of the motor independently of arms O and U, and, as above stated, arm R will remain in contact with any button C to which it is adjusted. Armature $m^3$ is provided with a projection which is pivoted upon lever U, as shown in Fig. 1.

When arm U is released by magnet M upon the occurrence of "no voltage," spring S will drive said arm against coiled-spring bumper $x^2$ on rheostat-switch R, the blow carrying switch R forward, and both arms will be arrested when bumper $x$ strikes arm O, when switch-arm R will rest on the first blind contact C.

The circuit connections are as follows: From the main line the circuit extends through the usual double-pole line-switch to conductors 1 and 2, the former being connected with binding-post 3 and the latter leading to the shunt connections of the motor, and from the armature of the motor conductor 4 leads to binding-post 5, and from the field-winding a conductor 6 leads to binding-post 7. From binding-post 3 a conductor 8, carried underneath base A, extends to the coil of solenoid M' and from the solenoid to the stationary switch-contact O', the circuit then leading through the switch-lever O, rheostat-switch R, the resistance of the rheostat, and from the final contact C to binding-post 5. The connections between binding-posts 3 and 5 just described are the armature connections of the motor, and, as will be evident, the overload-magnet, the overload-switch, the rheostat-switch, and resistance are in series in the armature-circuit. From the pivot P within the rheostat extends a conductor 9 to binding-post 10, with which one end of the coil of magnet M is connected, the other end of the magnet-coil being connected to binding-post 7, the magnet M therefore being in the field-circuit of the motor and, as will be evident from the description, overload-magnet M', switch O, and magnet M will be in series in the field-circuit of the motor.

In operating the controller overload-switch O is moved to its normal or closed position by the rheostat-switch R through the engagement of the bumper $x$ with arm O. It will be noted that arm O is not provided with an operating-handle, and therefore can only be closed through arm R, as stated. This feature insures the insertion of the entire resistance of the rheostat or the opening of the circuit at the blind contacts before or simultaneously with the closure of the overload-switch, so that it will be impossible to throw an overload or the full normal current into the circuit of the motor or other translating device with the first movement of the controller. Thus if an overload occurs while the operator is still operating the rheostat-arm R the overload-switch will respond and break the circuit. In practice after the overload-switch is closed by arm R arm U is moved to its normal position, and this movement moves arm R through short arm U² to the closed-circuit position shown in Fig. 1. Magnet M, being now energized, will hold arm U in position, and the operator is free to adjust arm R by means of its handle to any desired position, independently of arms O and U, to vary the resistance in the circuit of the motor-armature or other translating device. Thus it will be seen that should an underload or "no voltage" occur while the operator is adjusting arm R the underload-magnet M will respond, and arm U being released will fly around and strike bumper $x^2$, thus at least warning the operator of the condition of the circuit, if not actually jerking the handle $r$ from his grasp, and returning arm R to its starting position. If the operator should attempt to move arm U to its normal position by means of arm R through the engagement of bumper $x^2$ with the former, it will be seen that stop $x'$ will arrest the movement of arm R before arm U is brought near enough to magnet M to be held by it, and hence both arms will return to their starting positions when released by the operator. Thus it will be seen that in operating the controller to close the circuit to a translating device the circuit can only be closed by first closing switch O before the circuit is closed through the resistance, then the circuit must be closed through the resistance before the underload device will remain in its normal position, and that then if the circuit is in normal condition the resistance in circuit may be varied at will. It will be noted that the angle through which arm U moves before it strikes the bumper on arm R even when that arm is on the final contact is considerable and that the momentum gained by arm U will cause it to impart a heavy blow to arm R sufficient under all conditions to start that arm rapidly toward its starting position. It will also be noted that arm U carries no current, and hence has no friction to overcome except at its pivot, and this minimum friction insures rapid starting of the arm when released by its magnet.

Instead of connecting the overload-magnet in circuit, as shown in Fig. 1, where it carries the whole current, I may connect it between the final rheostat-contact and binding-post 5 or between that binding-post and the motor-armature, the circuit connection from stationary contact O' being then direct to the binding-post 3, to which wire 1 is attached, or direct to the line-switch. With such an arrangement magnets M and M' would still be in two shunt-circuits; but the former would carry only the field-current and the latter would carry only the armature-current.

In the construction shown in Fig. 4 arm R is the speed-controlling arm and can be left in any desired position, so as to have any desired resistance in the armature-circuit. Arm H is the hammer-blow arm and is normally held by a pivoted latch $h$ against the action of spring S, one end of which is secured to arm H and the other end is secured to pivot P. In this construction two solenoids M and M' are employed and latch $h$ is provided with two arms $l$ and $l'$, with which the cores of solenoids M and M' coöperate to release arm H. When "no voltage" occurs, the plunger or core of solenoid M falls and delivers a hammer-blow upon arm $l$ of the latch, tripping the same and allowing the spring to throw arm H as in the construction shown in Fig. 1 and with the same result. When overload occurs, the plunger or core of solenoid M' rises and trips latch $h$ by a hammer-blow on arm $l'$, the resulting action being the same as when no voltage occurs. Thus in this form arm R performs the functions of arms R and O of Fig. 1.

In both Figs. 1 and 4 I have shown the "no-voltage" winding as being in series with the shunt field-winding of a motor. In some instances this winding will be across the line, or it will be a series winding in series with the overload-winding, in which latter case it would be actuated by minimum current.

In using the term "circuit-controller" I intend to include any device which by its movement effects a change of condition in a circuit.

What I claim is—

1. In a regulating-rheostat, the combination of a hand-operated current-carrying arm, a hammer-arm normally restrained against a force constantly tending to move the hammer-arm, means for releasing the hammer-arm when the electromotive force of the circuit passes a certain limit, and automatic means for opening the circuit when the current in the circuit passes a certain limit.

2. The combination in a regulating-rheostat, of a hand-operated resistance-controlling switch, an independent automatic switch-arm which is responsive to a predetermined overload-current, and an independent arm which is responsive to a condition of "no voltage" upon the terminals of a translating device and which under such conditions operates to insert a resistance in the circuit.

3. The combination of a shunt-wound electric motor, a hand-operated resistance-controlling switch in series with the motor-armature, an electromagnetic circuit-breaker in series with the current to the motor-armature, and a "no-voltage" device normally held against the action of a spring by an electromagnet in series with the shunt field-winding of the motor and which affects the circuit to the motor-armature when "no voltage" occurs on the circuit.

4. The combination of a shunt-wound electric motor connected to a circuit of constant electromotive force, a controller therefor having three pivotally-connected arms as follows: a hand-operated resistance-controlling arm, a "no-voltage" arm normally held in a certain position and released by the failure of magnetism in an electromagnet which is in series with the shunt field-winding of the motor, and a third arm which is the switch-arm of an electromagnetic circuit-breaker.

5. In a motor-rheostat, a resistance-adjusting switch which can be moved in either direction over the contacts and left in any desired position, an electromagnetic automatic circuit-breaker in series therewith and functionally connected therewith, and means for moving the resistance-controlling switch in the direction to insert resistance whenever the electromotive force upon the circuit fails.

6. In a circuit-controller, the combination of a resistance-adjusting switch, an electromagnetic circuit-breaker arm in series therewith, and a hammer-blow arm which upon failure of the supply electromotive force delivers a blow upon the resistance-adjusting arm and moves it so as to insert resistance or to open the circuit.

7. In a circuit-controller, the combination of three levers in combination, one being the switch-lever of an electromagnetic circuit-breaker, a second lever being a hand-operated resistance-adjusting switch, the third lever being a hammer-blow lever which upon a failure of the supply electromotive force acts to open the circuit.

8. In a circuit-controller, the combination of a "hammer-blow" arm provided with a handle, a pivot for said arm, a spring tending to move it out of normal position, means for holding the said arm against the action of said spring and which releases the said arm when the electromotive force upon the circuit is reduced below a certain limit, a resistance-adjusting switch mounted on said pivot and provided with an operating-handle by which it is adjusted so as to have any desired portion of the resistance in the circuit, said resistance-switch being in the path of motion of the "hammer-blow" arm so that when the electromotive force is reduced below a certain limit the hammer-blow arm delivers a blow to said resistance-switch and drives it in the direction to insert resistance in the circuit.

9. In a motor-speed controller, the combination of a resistance, a resistance-controlling arm which can be adjusted by hand and left so as to have any desired part of the resistance in circuit, and independent functionally-connected means for protecting the motor-circuit under conditions of "no voltage" and "overload current."

10. In a regulating-rheostat, the combination of a resistance, a pivoted resistance-controlling switch which can be set permanently so as to insert any desired part of the resistance in circuit, a spring-actuated switch functionally connected with said resistance-switch and electrically connected in series therewith, and two independent electroresponsive devices for controlling the circuit through said switches, one being in series with the motor-armature and the other being in a circuit which is in shunt with the motor-armature, the said two electroresponsive devices acting respectively to affect said switches whenever the energy in the circuit exceeds a certain maximum or falls below a certain minimum.

11. In a regulating-rheostat, the combination of a resistance, a pivoted resistance-controlling switch which can be set permanently so as to insert any desired part of the resistance in circuit, a spring-actuated switch electrically connected in series with said resistance-switch, a single pivot for both switches, and two independent electroresponsive devices for controlling the circuit through said switches, one being in series with the motor-armature and the other being in a circuit which is in shunt with the motor-armature, the said two electroresponsive devices acting respectively to affect said switches whenever the energy in the circuit exceeds a certain maximum or falls below a certain minimum.

12. In a regulating-rheostat, the combination of a resistance, a pivoted resistance-controlling switch which can be set permanently so as to insert any desired part of the resistance in circuit, a spring-actuated switch electrically connected in series with said resistance-switch, interlocking means whereby the spring-actuated switch is moved to the closed position by the resistance-switch, and two independent electroresponsive devices for controlling the circuit through said switches, one being in series with the motor-armature and the other being in a circuit which is in shunt with the motor-armature, the said two electroresponsive devices acting respectively to affect said switches whenever the energy in the circuit exceeds a certain maximum or falls below a certain minimum.

13. In a regulating-rheostat, the combination of a resistance, a pivoted resistance-controlling switch which can be set permanently so as to insert any desired part of the resistance in circuit, a spring-actuated switch electrically connected in series with said resistance-switch, interlocking means whereby the spring-actuated switch is moved to the closed position by the resistance-switch, a spring-actuated arm provided with means for holding it in normal position against the spring tension and arranged to strike said resistance-switch when released to return said switch to its starting position, and two independent electroresponsive devices for controlling the circuit through said switches, one being in series with the motor-armature and the other being in a circuit which is in shunt with the motor-armature, the said two electroresponsive devices acting respectively to affect the spring-actuated switch and the spring-actuated arm whenever the energy in the circuit exceeds a certain maximum or falls below a certain minimum.

14. In a circuit-controller, the combination with a pivoted switch-arm, of a cushion-stop for limiting the movement of said arm comprising a coiled spring mounted in a socket, substantially as set forth.

15. In a circuit-controller, the combination with several interlocking pivoted arms, of a cushion-bumper for said arms comprising a coiled spring carried by a socket on one of said arms, substantially as set forth.

16. In a circuit-controller, the combination with a movable switch-arm, of a stationary spring-clip contact, comprising two spring-blades bent into U shape with free ends turned inward, and the other ends bent at an angle so as to lie in close contact, and two clamping-plates for receiving said ends, and said plates having curved ends forming a seat for the curved or shoulder portions of said blades, substantially as set forth.

17. In a rheostat, the combination with the resistance and the contacts, of a contact-lever, a spring-actuated switch-arm, an operating-arm having a barrel containing a coiled spring connected between said switch-arm and said operating-arm, a common pivot for said contact-lever and arms, and an electroresponsive device controlling each of said arms, substantially as set forth.

18. In a rheostat, the combination with the resistance and the contacts, of a contact-lever, a spring-actuated switch-arm, an operating-arm having a barrel containing a coiled spring connected between said switch-arm and said operating-arm, a common pivot for said contact-lever and arms, a latch for holding said switch-arm in its normal position, an electroresponsive device controlling the release of said switch, and an electroresponsive device for controlling said operating-arm, substantially as set forth.

19. In a rheostat, the combination with the resistance and the contacts, of a contact-lever, a spring-actuated switch-arm, an operating-arm having a barrel containing a coiled spring connected between said switch-arm and said operating-arm, said contact-lever, switch-arm and operating-arm, being functionally connected, and a common pivot for said lever and arms, substantially as set forth.

20. In a rheostat, the combination with the resistance and the contacts, of a contact-lever, a spring-actuated switch-arm, an operating-arm having a barrel containing a coiled spring connected between said switch-arm and said operating-arm, said contact-lever, switch-arm and operating-arm being functionally connected, a common pivot for said lever and arms, and an electroresponsive device controlling each of said arms, substantially as set forth.

21. In a rheostat, the combination with the resistance and the contacts, of a contact-lever, a spring-actuated switch-arm, an operating-arm having a barrel containing a coiled spring connected between said switch-arm and said operating-arm, said contact-lever, switch-arm and operating-arm being functionally connected, a common pivot for said lever and arms, a latch for holding said switch-arm in its normal position, an electroresponsive device controlling the release of said switch, and an electroresponsive device for controlling said operating-arm, substantially as set forth.

22. In a rheostat, the combination of a base-plate carrying stationary contacts and a movable contact-lever, a series of tubes made of insulating material and having arranged thereon the steps or sections of the resistance, and brackets secured to said base and supporting said resistance-tubes, substantially as set forth.

23. In a rheostat, the combination of a base-plate carrying stationary contacts and a movable contact-lever on one side thereof, brackets on the opposite side of said base, and a series of tubes made of insulating material carried thereby, said tubes having arranged thereon the steps or sections of the resistance, substantially as set forth.

24. In a rheostat, the combination of a base-plate carrying stationary contacts and a movable contact-lever on one side thereof, brackets on the opposite side of said base, and a series of tubes made of mineral insulating material carried thereby, said tubes having arranged thereon the steps or sections of the resistance, substantially as set forth.

25. In a rheostat, the combination of a base-plate carrying stationary contacts and a movable contact-lever on one side thereof, brackets on the opposite side of said base, and a series of tubes made of pottery carried thereby, said tubes having arranged thereon the steps or sections of the resistance, substantially as set forth.

26. In a rheostat, the combination of a base-plate carrying stationary contacts and a movable contact-lever on one side thereof, brackets on the opposite side of said base, and a series of tubes made of insulating material carried by rods secured to said brackets, said tubes having arranged thereon the steps or sections of the resistance, substantially as set forth.

27. In a rheostat, the combination with a base-plate, the contacts and switch-lever on one side thereof, and the resistance mounted on the opposite side, of a casing for said resistance secured to said base and comprising perforated walls E, slotted retaining-posts D, and bottom plate B, substantially as set forth.

28. In a rheostat, the combination with a base-plate, the contacts and switch-lever on one side thereof, and the resistance mounted on the opposite side, of a casing for said resistance secured to said base and comprising perforated sheet-metal walls E, slotted metal retaining-posts D, sheet-iron bottom plate B, and bolts $d$ securing said bottom plate and posts together and to the base-plate, substantially as set forth.

This specification signed and witnessed this 4th day of May, 1901.

H. WARD LEONARD.

Witnesses:
FRANK L. DYER,
JNO. R. TAYLOR.